United States Patent
Linna et al.

(10) Patent No.: US 6,845,760 B2
(45) Date of Patent: Jan. 25, 2005

(54) INTERNAL COMBUSTION ENGINE TRANSIENT FUEL CONTROL

(75) Inventors: Jan-Roger Linna, Boston, MA (US); Peter Palmer, Carson City, NV (US); John Paul Mello, Belmont, MA (US); Stuart Bennett Sprague, Oakland, CA (US)

(73) Assignee: Chrysalis Technologies Incorporated, Richmond, VA (US)

( * ) Notice: Subject to any disclaimer, the term of this patent is extended or adjusted under 35 U.S.C. 154(b) by 0 days.

(21) Appl. No.: 10/758,445

(22) Filed: Jan. 15, 2004

(65) Prior Publication Data

US 2004/0182375 A1 Sep. 23, 2004

Related U.S. Application Data

(60) Provisional application No. 60/440,021, filed on Jan. 15, 2003.

(51) Int. Cl.[7] ............................................... F02M 51/00
(52) U.S. Cl. ........................ 123/480; 123/478; 123/445
(58) Field of Search ................................ 123/543, 549, 123/294, 434, 672, 445, 472, 478, 480; 239/133, 134

(56) References Cited

U.S. PATENT DOCUMENTS

| 4,411,243 A | 10/1983 | Hardenberg et al. |
|---|---|---|
| 4,444,158 A | 4/1984 | Yoon |
| 4,450,822 A | 5/1984 | Venning |
| 4,476,818 A | 10/1984 | Yoon |
| 4,972,821 A | 11/1990 | Mauller |
| 5,284,117 A | 2/1994 | Akase |
| 5,361,990 A * | 11/1994 | Pimentel ..................... 239/133 |
| 6,109,247 A * | 8/2000 | Hunt ......................... 123/549 |
| 6,145,494 A | 11/2000 | Klopp |
| 6,237,576 B1 | 5/2001 | Buccino et al. |
| 6,289,881 B1 | 9/2001 | Klopp |
| 6,779,513 B2 * | 8/2004 | Pellizzari et al. ........... 123/549 |

* cited by examiner

*Primary Examiner*—Bibhu Mohanty
(74) *Attorney, Agent, or Firm*—Roberts, Mlotkowski & Hobbes

(57) ABSTRACT

An apparatus and method for improving the transient response of a spark-ignited fuel-injected internal combustion engine is disclosed. This is accomplished by employing one or more novel capillary fuel injectors. These devices are port fuel injectors modified by inserting one or more relatively small diameter heated tubular capillaries between the fuel line and a conventional injector. Sufficient heating can be produced so that flash vaporization occurs as the fuel exits the injector. The heaters are turned on using control algorithms that can be based on exhaust gas oxygen concentration, load on the engine, and accelerator pedal position.

52 Claims, 6 Drawing Sheets

INTERNAL COMBUSTION ENGINE TRANSIENT FUEL CONTROL

RELATED APPLICATIONS

This patent application claims priority to Provisional Application Ser. No. 60/440,021, filed on Jan. 15, 2003, the contents of which are hereby incorporated by reference.

BACKGROUND

Since the late 1970's, automotive spark ignition (SI) internal combustion engines have transitioned away from using carburetors. Various fuel injection systems were adopted to meet ever more stringent pollution control requirements. Currently, sequential multi-port fuel injection (PFI) systems are preferred.

In a sequential multi-port fuel injection system, each cylinder is supplied with one or more fuel injectors. These are usually solenoid operated valves that culminate in a nozzle that sprays the back of one or more intake valves or the intake port wall with gasoline at selected times. The timing is normally adjusted to inject fuel (onto the intake port wall or intake valve) when the intake valves are closed. The amount of fuel exiting the injector depends on the pressure in the line feeding the injector, the injector nozzle design, and the length of time the valve is open. Usually, all the injectors in an engine are fed with a constant pressure fuel rail. Thus, the gasoline output is almost linearly related to the duration of the valve open pulse width.

The pulse width is controlled by an electronic control unit (ECU) that is designed to, in general terms, optimize engine response while at the same time maximizing efficiency and minimizing pollution. None of these results are measured directly. Instead, various engine parameters are measured and these are optimized. The usual goal is to produce a stoichiometric air/fuel ratio for any given operating condition, which enables the use of a three way catalytic reactor in the exhaust to simultaneously oxidize any remaining unburned fuel products (HC and CO) and reduce nitrogen-oxides ($NO_x$). The control algorithms are not simple. Basically, pressing the accelerator pedal opens an air intake valve or throttle placed between an air cleaner and an air intake manifold. A mass air flow sensor or combination of other sensors measures the mass of air going into the engine's cylinders. This determines the amount of fuel required for stoichiometric operation, which determines a target pulse width.

Typically, the target pulse width to obtain a given fuel flow is obtained from a look up table or "fuel map" programmed into the ECU at the factory. To allow for normal in-use variations such as small variations in fuel density and composition between different fill-ups, variations in ambient air density, viscosity, and humidity, as well as sample-to-sample variability among nominally identical hardware (e.g., fuel injectors), an oxygen sensor ($O_2$ sensor) in the exhaust line before the catalytic converter is used to generate a feedback signal to the ECU so that the fuel map values can be trimmed accordingly. With such a feedback system, the ECU can also compensate for changes in hardware performance as the engine ages. Most $O_2$ sensors in current production automobiles have only binary outputs, but a few use more costly linear output versions in an attempt to obtain better fine tuning.

With a stoichiometric fuel ratio, ideally, all of the oxygen should be used up during combustion. If not, it means the factory installed fuel map should be adjusted to supply more fuel under the same conditions. Some ECUs can average over a long time and make permanent adjustments as well as making temporary ones to the memorized fuel map.

There are many more sensors and algorithms that are used to adjust the pulse width. One of these is a throttle position sensor. When this opens rapidly, the ECU increases the injector pulse width in an attempt to provide enough fuel. Even so, a rapid throttle opening usually results in a temporarily overly lean fuel mixture that can produce a $NO_x$ breakthrough over the catalyst unless it has enough oxygen storage capacity available. The reason can be understood from the following situation. In a warmed up engine, conventional port fuel injectors spray fairly large droplets (100–300 microns) onto the back of the relatively hot intake valve, valve stem, valve seat and surrounding structure. These components become coated with a film of liquid gasoline (in a process known as "wall wetting") that is constantly evaporating and being sucked into the cylinder while being replenished by the injector. Under normal cruise, that is to say close to steady state conditions, the liquid gasoline from the injectors just balances the gasoline vapor entering the cylinder. When the throttle is opened, the injector valves are held open longer, i.e., the injector duty cycle is increased, and the wetted area starts to increase. As the area increases, evaporation and intake into the cylinder increases until some new equilibrium is reached.

The evaporation of wall-wetted fuel is a dynamic and complex phenomenon that varies considerably over engine operating conditions and through transient operation. Specifically, the time required for the wall-wetted fuel to evaporate is a function of several parameters that are not directly controllable in modern engines. These parameters include the following: intake component temperatures, the amount of fuel deposited on the intake components, and the amount of fuel that has evaporated from one engine cycle to the next and so on.

Since these parameters are not directly controllable, wall-wetting inherently limits the ability to control the air/fuel ratio in the combustion chamber during engine acceleration and deceleration. During acceleration, the evaporation of wall-wetted fuel lags behind the sudden increase in fuel demand, and the engine operates fuel lean for a short period. Conversely, during deceleration, the evaporation of wall-wetted fuel is excessive in view of the sudden decrease in fuel demand, and the engine operates fuel rich for a short period.

When there is a throttle opening transient during acceleration, the fast throttle opening can be sensed and the fuel injector can temporarily inject extra fuel in order to quickly build-up the amount in the fuel-film, then cut back to the new steady state requirements. In this case, it is believed that there is a shorter lean time, followed by a rich mixture before settling back to an optimum steady state. Irrespective of the details of the transient response, the problem is that the time to build up increased wall wetting takes more time, many engine cycles, than is desirable. In general, conventional fuel injection systems are slow enough that they cannot handle transients without unwanted fluctuations in air/fuel ratio.

Another major problem is that, for modern SI engines operating with a three-way catalyst (TWC) for exhaust after-treatment, the aforementioned excursions in rich and lean air/fuel ratio directly influence the size (and cost) of the TWC required to meet a given emission standard. In particular, each TWC is sized for sufficient oxygen storage such that CO and hydrocarbon oxidation still occurs during rich excursions in air/fuel ratio and NO conversion occurs during lean excursions. Thus, the size of the TWC required for certifying an engine to a given emission standard is a direct function of the ability to control the air/fuel ratio about the stoichiometric value through the transient conditions encountered over the engine test cycle (e.g., the U.S. Federal Test Procedure 75 (FTP-75) cycle used in a number of countries).

Clearly, it would be beneficial to provide engines with a faster responding fuel supply system, at least operational for transient periods, that does not depend as much on evaporation from a fuel film to supply vaporized fuel to the engine cylinder. This would reduce the time lag and the resulting fluctuations in mixture strength.

Heating gasoline before injection has been proposed to solve cold engine starting problems, but so far has not been applied to improving the transient response. An example is U.S. Pat. No. 6,332,457, issued Dec. 25, 2001 to Imoehl, and incorporated herein by reference. FIG. 1 of that patent is a schematic illustration of a conventional port fuel injector positioned in an intake manifold and having its output directed in the general direction of an intake valve. An unconventional heater is included in the tip of the injector. For the purposes of aiding in starting a cold engine, the invention is based on enhancing atomization by heating fuel and using flash boiling.

Flash boiling occurs when heated fuel at higher pressure is injected into the intake manifold at a lower pressure. Using the heated tip injector, it was possible to vaporize 50% of the fuel at low manifold pressures with flow rates of 0.1 to 0.7 g/s. The utility of flash boiling is that it overcomes a problem with vaporizing fuel in the injector tip. The mass flow with vaporized fuel is significantly less than for liquid fuel. If the fuel remains a liquid until it is ejected from the tip, then mass flow can be maintained, but the liquid turns into a vapor as it is directed toward the intake port. Unfortunately, the heater design in this patent required 5 seconds to reach these outputs. This may be adequate to ameliorate the cold start problem, but is too slow for driving transients.

SUMMARY

Accordingly, the invention provides an apparatus and method for improving the transient response of a spark-ignited fuel-injected internal combustion engine. This is accomplished by employing one or more novel capillary fuel injectors. These devices are port fuel injectors modified with a novel fuel conditioner having an input in fluid communication with the fuel rail and an output in fluid communication with an otherwise conventional fuel injector in front of the injector output nozzle. A preferred version of this conditioner is comprised of one or more relatively small internal diameter capillary tubes that are connected in parallel and heated along a part of their length. A convenient electrical heater can be made by using sufficiently thin-walled resistive tubing to form a practical heating element along its length. In one version, the capillary fuel injectors are surrounded by a ceramic sheath to provide electrical insulation inside the fuel injectors.

In one preferred version, each conventional port fuel injector in an engine would be replaced by a capillary fuel injector. Using a flash vaporization technique, under some conditions, the capillary fuel injectors can provide an increase in vaporized fuel into a cylinder much faster than the wall-wetting approach that is conventionally used in modern engines. Although the electrical heaters are analog elements, it is convenient to control them in an on/off manner. The on power level is determined for each engine to provide enough heater power to produce flash vaporization.

The capillary fuel injector heaters are controlled with a modified ECU that is provided with conventional engine parameters. The required fuel load is determined in a conventional manner from a look-up table based on an air flow meter or a combination of engine speed, manifold pressure, and intake air pressure inputs. These and other transient engine parameters serve as signals to turn the capillary fuel injector heaters on and off to reduce engine response time to transients.

Two methods are available when a linear output $O_2$ sensor is installed. In one, when the fuel flow demand is less than a threshold that indicates engine operation under part load conditions, and at the same time, the $O_2$ sensor indicates a lean or rich excursion beyond a threshold value, the capillary fuel injector heaters are turned on.

In another method, under any load conditions, the capillary fuel injector heaters are turned on if the $O_2$ sensor indicates a lean or rich condition greater than a threshold value.

Another method, useful when a linear $O_2$ sensor is not used on the engine, monitors the accelerator pedal and if the rate of change in the direction of opening the throttle exceeds a preset value, the capillary fuel injector heaters are turned on.

More generally, the invention provides for an internal combustion engine with an improved transient response having: a) at least one port fuel injector with at least one fuel-carrying capillary tube between a fuel source and the fuel injector, said capillary tube being provided with a fuel heater and b) an electronic apparatus configured to monitor selected engine parameters and produce a heater signal that energizes the capillary tube fuel heater in response to selected parameter values.

In particular, the selected engine parameter can be the oxygen level at the output of an exhaust manifold. More particularly, the selected parameter value can be an oxygen level absolute value of the deviation from stoichiometry greater than a selected oxygen threshold. As a variation, the electronic apparatus can logically AND said oxygen level absolute value parameter with a determination that fuel demand is less than a part load condition to produce the heater signal. As another variation, the engine parameter can be the rate of change of position of the engine accelerator pedal and the parameter value a selected rate of change threshold.

BRIEF DESCRIPTION OF THE DRAWINGS

The invention will now be described in more detail with reference to preferred forms of the inventions, given only by way of example, with reference to the accompanying drawings, in which.

DETAILED DESCRIPTION

Figure 1:
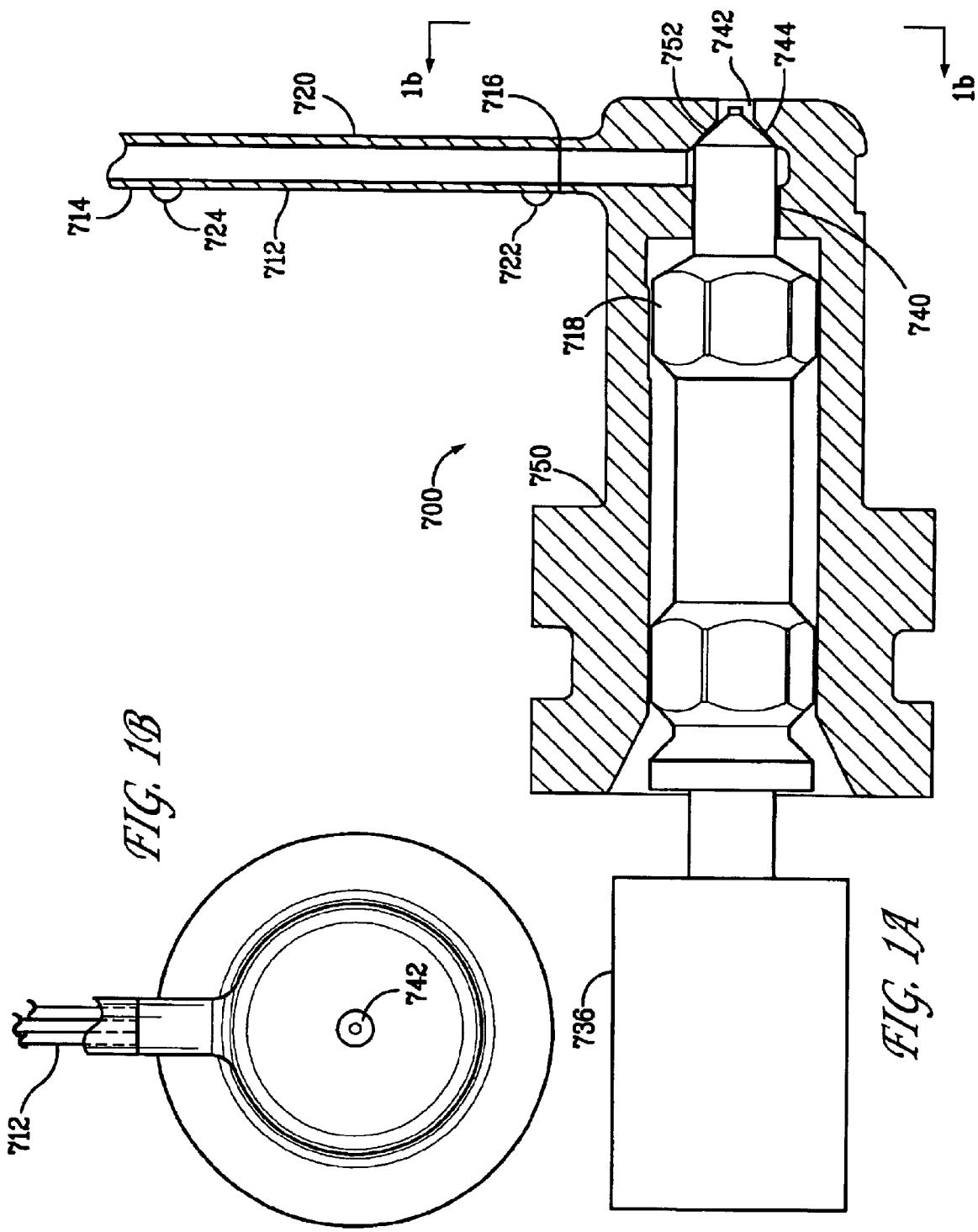
FIG. 1A illustrates a capillary fuel injector in cross-section.
FIG. 1B illustrates an end view of FIG. 1A.

To mitigate the lag between the supply and demand of fuel, rapid vaporization during engine transients may be achieved through the use of heated capillaries incorporated into the function of conventional fuel injectors as disclosed in U.S. patent application Ser. No. 10/143,250, entitled "Fuel Injector for and Internal Combustion Engine," filed by Pellizzari et al. on May 10, 2002, U.S. patent application Ser. No. 10/284,180, entitled "Fuel System for an Internal Combustion Engine and Method for Controlling Same," filed by Linna, et al. on Oct. 31, 2002, as a continuation-in-part of application Ser. No. 10/143,250, and U.S. patent application Ser. No. 10/342,267, entitled "Capillary Fuel Injector with Metering Valve for an Internal Combustion Engine," filed by Linna, et al. on Jan. 15, 2003 as a continuation-in-part of application Ser. No. 10/143,250, and having inventors in common with the present invention, each of which are assigned to the assignee of the present invention and incorporated herein by reference.

The above applications disclose the use of capillary flow paths with high surface area-to-volume ratios in combination with a heater means to quickly vaporize fuel using a minimal amount of power. One preferred embodiment uses the capillary channel itself as a heater resistance element. The capillary inlet is in fluid communication with a fuel source and the outlet is in fluid communication with a fuel metering valve.

The main objective disclosed in the above referenced applications is to reduce unburned hydrocarbon emissions during cold-start and warm-up operation of a PFI engine prior to light-off of the three-way catalyst (TWC). Under cold-start and warm-up conditions, conventional port fuel injectors must typically supply more than a stoichiometric amount of fuel such that a sufficient fraction evaporates to form a combustible mixture in the combustion chamber. Such excess fueling results in high levels of unburned hydrocarbons in the exhaust. By contrast, the use of the capillary fuel injector to vaporize fuel eliminates the need for initial over-fueling, thereby allowing the engine to be started stoichiometric or lean and ultimately reducing unburned hydrocarbon emissions in the exhaust.

Of the embodiments discussed in the above referenced documents, it is believed that the most useful version for improving engine transient response is the one illustrated in FIG. 1A. Although it works for the purpose of controlling transient response, another later developed embodiment discussed below is now believed to be more useful. Capillary fuel injector 700 includes at least one capillary flow passage 712, having an inlet end 714 and an outlet end 716. The inlet end 714 is placed in fluid communication with a liquid fuel source (e.g., the fuel rail, not shown) for introducing the liquid fuel into the capillary flow passage 712. Advantageously, as illustrated in FIG. 1B, capillary fuel injector 700 may include a plurality of capillaries 712 to increase fuel flow capabilities.

A plunger valve assembly 718 is positioned within housing 750 and operated by a solenoid (not shown), having electrical coil windings. As is preferred in operation, when the coil windings are energized, the solenoid element 736 is drawn into the center of coil windings (not shown). When the coil is de-energized, solenoid element 736 returns to its original position through the use of a spring (not shown). A plunger assembly 740 is connected to the solenoid element 736. Movement of the solenoid element 736, caused by energizing the coil windings, causes the plunger assembly 740 to be drawn away from the outlet end 716 of the capillary flow passage 712 allowing fuel to flow through the orifice 742. As may be seen, sealing is achieved by the mating of frusto-conical section 744 of plunger assembly 740 with mating conical sealing surface 752 of housing 750. As may be appreciated, capillary fuel injector 700 may be combined with conventional actuator sections of the type commonly used in fuel injectors for automotive applications.

Heat source 720 is arranged along capillary flow passage 712 and is provided by forming capillary flow passage 712 from a tube of electrically resistive material, a portion of capillary flow passage 712 forming a heater element when a source of electrical current is connected to the tube at electrical connections 722 and 724 for delivering current. Heat source 720 is then operable to heat the liquid fuel in capillary flow passage 712 to a level sufficient to change at least a portion of it from a liquid state to a vapor state and deliver a stream of substantially vaporized fuel from the outlet end 716 of capillary flow passage 712. As may be appreciated, the volume of material of plunger assembly 740 that comes into contact with the vaporized fuel is minimal, making the thermal mass that must be heated in order to prevent premature condensation of the vapor small.

The capillary fuel injector can operate in three regimes. When the capillary fuel injector heaters 720 are off, the capillaries 712 supply liquid fuel to the fuel injector housing 750 for use as a normal port fuel injector. Liquid fuel is required at full load operating conditions in order to: 1) meet the mass flow requirements and 2) control knock through intake charge cooling of the evaporating fuel.

If the capillary fuel injector heaters 720 are heated to the point of vaporizing fuel within the capillary flow passages, the mass flow rate of fuel through the fuel injector will be too low for most operating conditions. At an optimum power level, the capillaries 712 will heat the fuel to such a temperature that flash vaporization occurs as the fuel experiences the rapid pressure drop across the injector metering orifice 742.

The optimum flash vaporization heating level will depend on the capillary material, ID, OD, and heater length, and the fuel temperature and pressure in the fuel rail. FIGS. 1A and 1B illustrate a geometry that is designated in the related applications referred to above as the XVA100027.

The XVA100027 design uses four capillaries made from 18/8 stainless steel each with a 0.020 in. (0.05 cm) ID, a 0.033 in. (0.08 cm) OD, and a 6.25 in. (15.9 cm) length between heater connections 722 and 724. For the XVA 100027 heaters, a power level of 320 watts with a fuel pressure of 100 psi appeared to be an optimum compromise. Herein below, a reference to turning a capillary fuel injector heater on means at a power level sufficient to achieve flash vaporization as described above, but not so high as to produce vaporization of the fuel within the capillary/injector fuel paths.

This flash vaporizing operating regime is described in even more detail in U.S. patent application Ser. No. 10/284, 180, entitled "Fuel System for an Internal Combustion Engine and Method for Controlling Same," filed by Linna, et al. on Oct. 31, 2002. As detailed in that application, the XVA100027 was able to produce vaporized fuel with a droplet size characterized as having a Sauter Mean Diameter of less than about 25 $\mu$m compared to the 100–300 $\mu$m size produced by conventional port fuel injectors. However, the embodiments described herein are separate from control methods related to start and warm-up of an engine.

Figure 2:
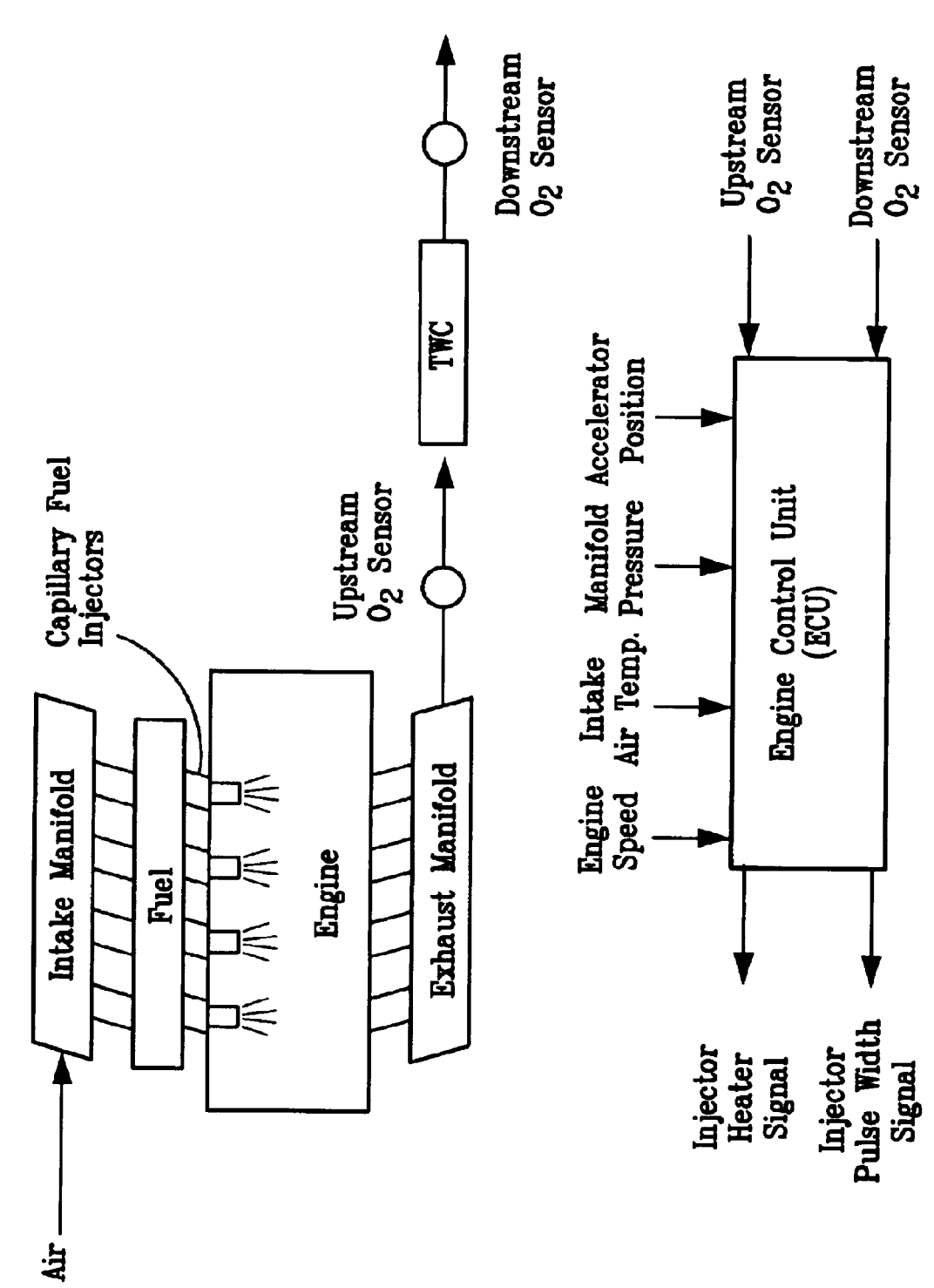
FIG. 2 illustrates an engine hardware configuration that uses the capillary fuel injectors illustrated in FIG. 1.

FIG. 2 illustrates the hardware configuration associated with one embodiment of the invention. As shown in FIG. 2, an SI engine is fueled by one capillary fuel injector per cylinder. Each capillary fuel injector receives two signals from the engine control unit (ECU): one signal for heat to the capillaries and one signal for pulse width modulation of the solenoid valve within the injector. As part of the conventional exhaust after-treatment system of the engine, the exhaust gases pass through a TWC before being emitted to atmosphere. Two exhaust gas linear $O_2$ sensors are positioned downstream of the engine as shown in FIG. 2. The signal from each exhaust linear $O_2$ sensor is sent to the ECU as an input. The $O_2$ sensor upstream of the TWC is the primary stoichiometric sensor. The $O_2$ sensor downstream of the TWC is used for long term calibrations of the upstream $O_2$ sensor and as an emergency backup. The accelerator position is also sent to the ECU as an input signal.

It should be recognized that more than the one fuel injector per cylinder could also be used to obtain higher mass transfer rates of vaporized fuel.

Assuming a warmed up engine, the hardware configuration shown in FIG. 2 is used to implement three different capillary fuel injector control algorithms.

Oxygen Sensor Based Algorithm

When a linear exhaust gas $O_2$ sensor is mounted on an engine, two algorithms may be based on the $O_2$ sensor inputs. One mode is operative under part load conditions and the other under all conditions.

"Part load" is a term that automotive engineers use without an exact definition. Generally, this means something less than 50% of peak torque output from the engine at any given engine speed. Typical city driving may be characterized as operating at about 30% or less of full load while highway cruising on a straight and level surface requires only about 10–15% of full load.

Figure 3:
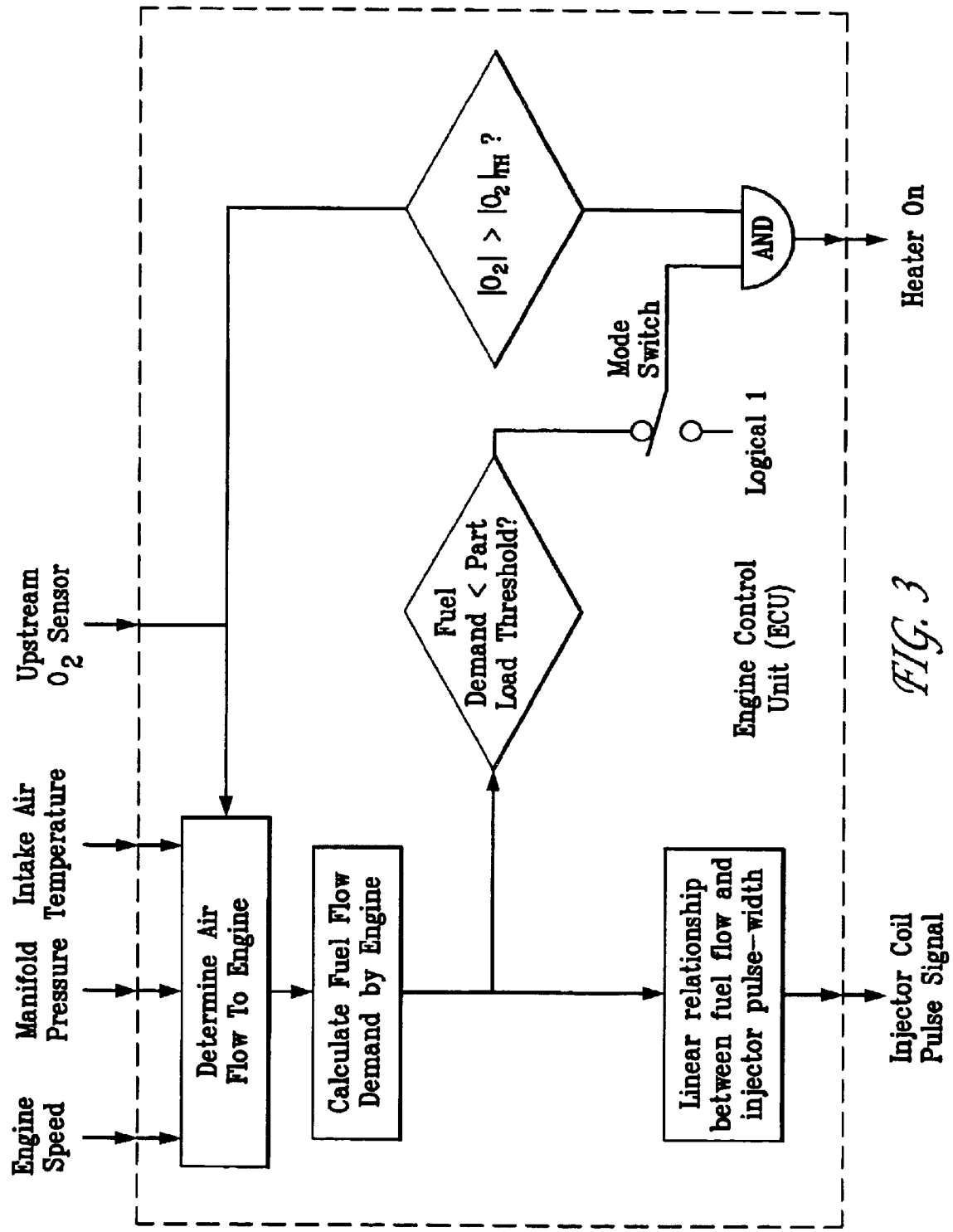
FIG. 3 illustrates an engine control unit configuration that uses the inputs from an oxygen sensor to control the capillary fuel injectors in the hardware configuration of FIG. 2.

FIG. 3 illustrates control algorithms based on the $O_2$ sensor. As is common practice, Engine Speed, Manifold Pressure, and Intake Air Temperature are used to calculate the engine Air Flow through a method commonly referred to as the speed-density method. An alternative is to use an air-flow meter directly. Once the engine Air Flow is known, the engine Fuel Flow Demand is determined from a look-up table. In subsequent time steps, this value is adjusted using the linear Upstream $O_2$ Sensor.

As illustrated, based on a linear relationship, the Injector Coil Pulse Signal width is adjusted in proportion to the Fuel Flow Demand.

In FIG. 3, the Upstream $O_2$ Sensor input reading is compared to one indicting a value close to stoichiometry. If the reading indicates either a too rich or too lean condition, then a signal is sent to the AND gate. There is a commonly used rule of thumb that a stoichiometric condition exists when the $O_2$ concentration is about 0.7% (not zero). Also, it is common knowledge that the linear $O_2$ sensors used in modern automobiles, also known as lambda sensors, measure the concentration and produce an electrical pump current that is zero at a stoichiometric condition, positive at a lean (excess $O_2$) condition, and negative at a rich (excess fuel) condition. Additional details about linear $O_2$ sensor characteristics can be found in the Bosch Automotive Handbook, 5th Edition (2000), Robert Bosch GmbH, 2000, Stuttgart, Germany, pp. 117–118, incorporated herein by reference. The decision box indicates that the absolute value $|O_2|$ of the pump current, or an analog, is compared to some $|O_2|_{TH}$ threshold. FIG. 3 shows the same threshold for deviations either way from stoichiometry, but in general, the comparison could be asymmetric.

The calculated Fuel Flow Demand is compared to a Part Load Threshold, e.g., 50% of full load, for the sake of a number. If the Mode Switch is connected to that decision box output, then when the Fuel Demand is less than Part load, a logical 1 is sent to the AND gate. Thus, the capillary fuel injector Heater On signal occurs under part load conditions when the $O_2$ sensor indicates a deviation from stoichiometry beyond a certain threshold. This results in flash vaporization of fuel as it exits the injector nozzle 742.

The somewhat arbitrary 50% criterion for part load is based, in part, on the output capacity of the capillary fuel injector. The working example had four capillaries. It would be fairly straightforward to construct capillary fuel injectors with eight or ten capillaries. Then it would be possible to meet the mass flow requirements at higher load levels. The foregoing need for more capillaries applies if one is attempting to control transients in cold as well as warmed up engines. In that case, flash vaporization works poorly and the fuel may have to be vaporized before exiting the capillaries which considerably reduces mass flow. In the case of fully warmed up engine, where flash vaporization may be expected to readily vaporize fuel heated by the capillaries, as few as one capillary, depending on engine size, may be adequate.

Controlling knock would dictate when the heaters would not be used and, instead, unheated liquid fuel would be supplied to the engine. This is because, as is well known, spontaneous ignition (knock) occurs more readily when the in-cylinder charge is hot and well vaporized. Conversely, for a hot engine, supplying unheated liquid fuel from the fuel injectors reduces knock because the liquid fuel absorbs heat from the intake manifold charge as it vaporizes in the conventional manner. The result is a slightly cooler in-cylinder charge that helps to prevent knock. Since knock occurs more often at higher loads, it may be more useful to control knock rather than transients by turning off the capillary heaters at all loads greater than some threshold.

The threshold will depend on the engine. For any particular engine and capillary design, it should be easy to determine an appropriate value. In a warmed up engine with a means of sensing knock, the threshold could be gradually increased until knocking started to occur under some load conditions, then set back. For some combinations of engine designs and operating conditions, it is possible that knocking never occurs. In this extreme, one might operate in a mode in which the capillary heaters were turned on whenever the $O_2$ sensor indicated a deviation from stoichiometry. In that case, the Mode Switch would be set to a logical 1 and Fuel Demand not taken into account.

Accelerator Positive Transient Operation

Figure 4:
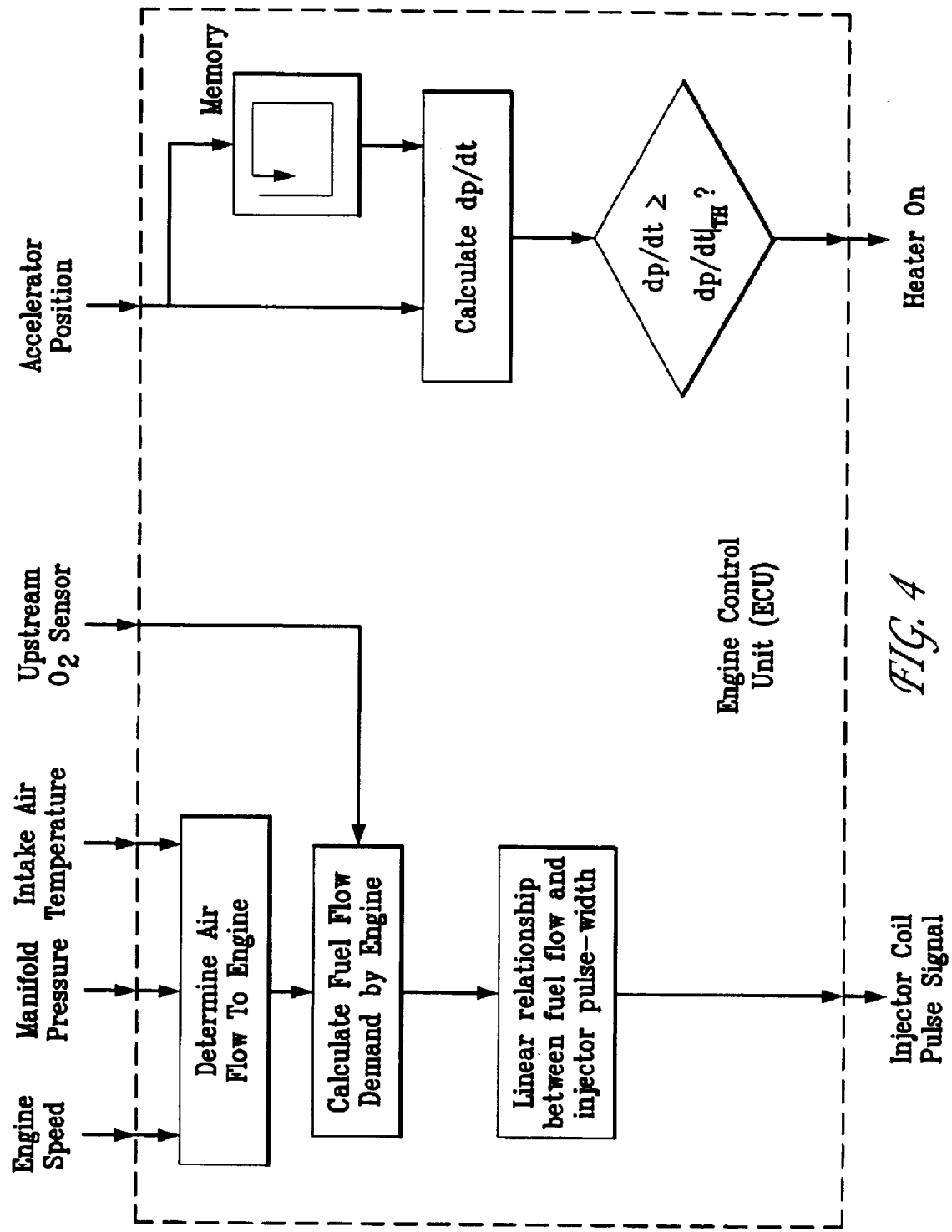
FIG. 4 illustrates an engine control unit configuration that uses the inputs from the accelerator pedal to control capillary fuel injectors in the hardware configuration of FIG. 2.

FIG. 4 illustrates an algorithm for control of fuel vaporization based only on accelerator position. This algorithm does not use an $O_2$ sensor and is an advantage because a linear $O_2$ sensor would not be required. A linear $O_2$ sensor is a significant added expense for an engine control system that otherwise makes use of less expensive binary $O_2$ sensors.

As illustrated in FIG. 4, under all conditions, the Injector Coil Pulse Signal is controlled in a conventional manner.

The Accelerator Position input is used to calculate its rate of change dp/dt. At each time-step in the algorithm, the value of dp/dt is determined by comparing the accelerator position in the current time-step to the accelerator position in the previous time-step such that the difference between the two values, divided by the known time-step, is dp/dt. If the value of dp/dt exceeds a predetermined threshold, the capillary fuel injector Heater On signal is activated until dp/dt falls below the threshold. This threshold must be determined for each engine design based on how fast the throttle opens, the response of the conventional port fuel injection system, and the particular capillary fuel injector design.

Even if the ECU increases the Injector Coil Pulse Signal width in response to dp/dt, delivery of vaporized fuel as discussed above using a capillary fuel injector will reduce the time lag associated with conventional wall-wetting/evaporation fueling techniques. Thus, the ECU could increase the Pulse Signal width for small values of dp/dt, while the capillary fuel injector Heater is reserved for larger ones.

An Improved Capillary Fuel Injector Design

Figure 5:
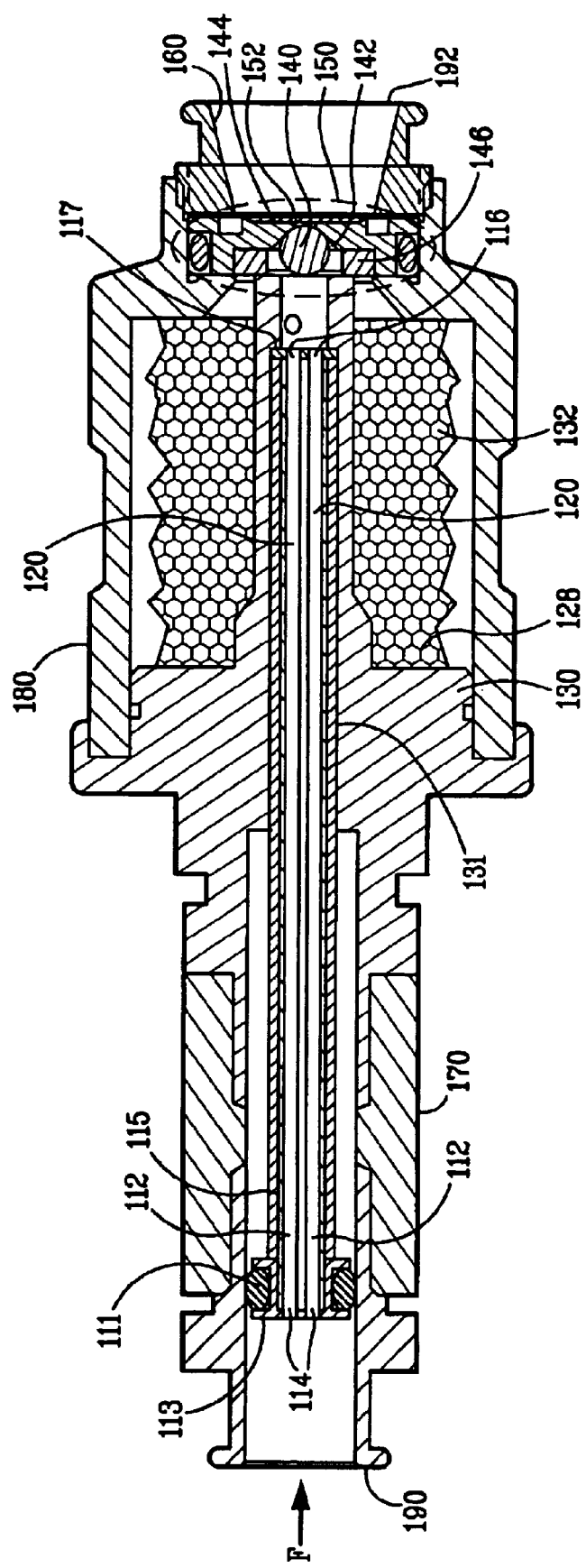
FIG. 5 illustrates a second version of a capillary fuel injector in cross-section.
Figure 6:
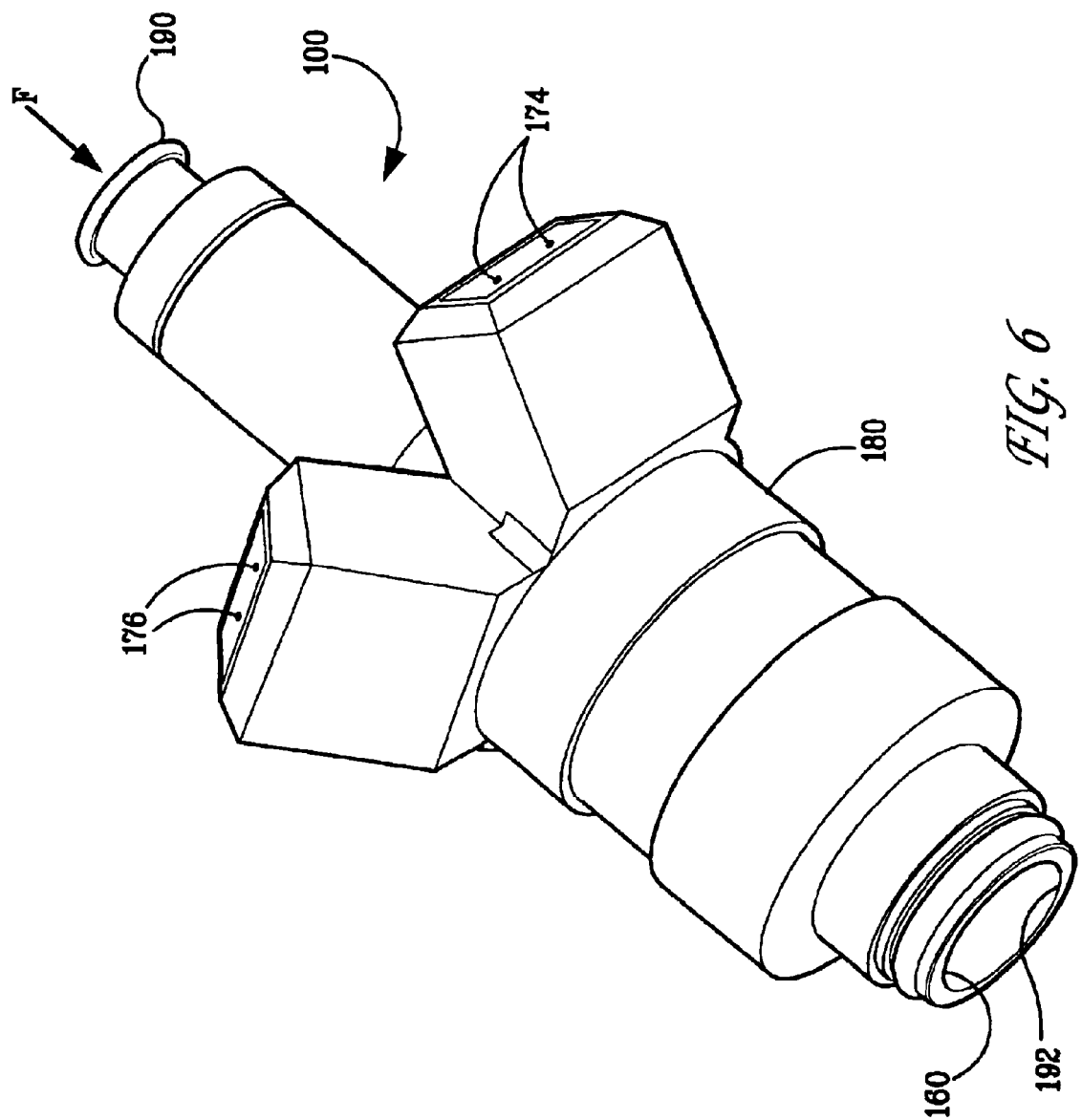
FIG. 6 illustrates an external isometric view of the capillary fuel injector illustrated in FIG. 5.

FIGS. 5 and 6 illustrate a capillary fuel injector 100 developed later than that illustrated in FIG. 1. (The lower numeral designations are an artifact. Both work for the purposes of this invention, but the later one is preferable.) It has an inlet 190 for admitting fuel F and an outlet 192. In terms of form and fit, it may be designed in a manner similar to conventional port fuel injectors, so as to be substantially interchangeable therewith. As is currently preferred, this embodiment possesses a ball-in-cone valve assembly 144. A capillary bundle 115 similar to the type shown in FIG. 1 is positioned within the central bore of the injector housing 180 and intermediate injector housing 130.

Capillary bundle 115 is shown having a plurality of capillary flow passages 112, each having an inlet end 114 positioned by inlet O-ring retainer 113 and an outlet end 116 terminating in a disc 117 and held in position by intermediate injector housing 130. The inlet retainer 113 is held in place by the rubber O-ring 111 that seals against fuel flow from source F that is in fluid communication with inlet end 114. A plastic coupling 170 attaches the inlet section 190 and inlet of the capillary bundle 115 to the intermediate injector housing 130. In one preferred embodiment, the capillary bundle 115 is surrounded by a ceramic sleeve 131.

A heat source 120, illustrated schematically, is arranged along each capillary flow passage 112. As is preferred, each heat source 120 is provided by forming capillary flow passage 112 from a tube of electrically resistive material, a portion of each capillary flow passage 112 forming a heater element when a source of electrical current is connected to the tubes as discussed herein below. Each heat source 120, as may be appreciated, is then operable to heat the liquid fuel in each capillary flow passage 112 to a sufficient level so that flash vaporization occurs on exiting the orifice 152 and results in a stream of substantially vaporized fuel at orifice 152.

As in the FIG. 1 embodiment, capillary bundle 115 may consist of one or more thin-walled capillary flow passages 112. In this embodiment, they are of about 0.028–0.029 in. (0.07 cm) ID and 0.032 in. (0.08 cm) OD. Capillary flow passages 112 may be constructed from stainless steel or annealed Inconel™ (a trademark of International Nickel Corporation) 600 tubes, each having a heated length 120 of from about 1.25 in. (3.17 cm) to about 2.50 in. (6.35 cm). When current is supplied to capillary bundle 115, the heated source 120 of each capillary passage 112 becomes hot. The heated and pressurized fuel then undergoes flash vaporization as a result of the sudden pressure drop across orifice 152 when the valve opens.

Currently, a preferred version of bundle 115 is comprised of four tubes of 18/8 stainless steel (AISI Type 304) having a 0.029 in. (0.074 cm) ID, a 0.032 in. (0.08 cm) OD, and a heated length of 2.00 in. (5.1 cm). Optimum power level for the bundle of four is in the range of 90–120 watts per 100–150 mg/sec of average fuel flow. The ceramic tube 131 is made of 94% alumina with an ID of 0.085 in. (0.22 cm) encompassing the bundle 115 and an OD of 0.104 in. (0.26 cm). This component provides both electrical and thermal insulation for the capillary tubes, but the primary purpose is to provide electrical insulation from the housing 130.

Referring again to FIG. 5, a low-mass ball valve assembly 144 is operated by solenoid 128. Solenoid 128 has coil windings 132 that may be connected to electrical connectors in any conventional manner. When the coil windings 132 are energized, a magnetic field is directed through plate 146, which is connected to ball 140, thereby causing it to lift from conical sealing surface 142, exposing an orifice 152, and allowing fuel to flow. When electricity is cut off from the coil windings 132, a spring (not shown) returns the plate 146 and attached ball 140 to their original position. The spring is dimensioned such that the force of the spring pushing the ball against the conical section of the injector exit is sufficient to block the flow of pressurized liquid fuel in the injector.

In an alternate embodiment, a solenoid element (not shown) could be drawn into the center of coil windings 132 to lift ball 140, which could be connected to the solenoid element. Movement of the solenoid element, caused by applying electricity to the coil windings 132, would cause the ball 140 to be drawn away from conical sealing surface 142, exposing an orifice 152, and allowing fuel to flow. Again, when electricity is cut off from the coil windings 132, a spring (not shown) returns the ball 140 to its original position.

Upon exiting the outlet ends 116 of capillary passages 112, fuel flow is directed toward ball-in-valve assembly 144 of the fuel injector 100. As with conventional fuel injectors, the metering section 150 consists of a solenoid operated ball-in-cone metering valve assembly 144. The act of actuating the solenoid 128 to move the plate 146 and ball 140 assembly between the open and closed position serves to meter the flow of fuel exiting the injector 100. Upon exiting the orifice 152, the fuel flows through a conical chimney section 160 to create the desired spray atomization and spray angle in the case of substantially liquid fuel sprays. The angle of the cone can span a wide range of values provided that the ball forms a seal with the surface of the cone. Chimney section 160 also serves to allow the injector 100 to satisfy overall length requirements of conventional port fuel injectors. As may be appreciated, proper operation of injector 100 is possible without the inclusion of the chimney section 160.

The current preferred method of making electrical connections to the capillary bundle 115 in order to provide heat sources 120 is to use a metallic O-ring retainer 113 and a metallic disc 117 that are brazed or otherwise electrically connected to the capillaries 112. A wire is attached to intermediate injector housing 130 that makes electrical contact to disc 117 and another wire attached to O-ring retainer 113.

FIG. 6 illustrates an outside isometric view of a capillary fuel injector 100. Wires 176 that connect to the solenoid 128 and wires 174 that connect to the capillary bundle 115 illustrated in FIG. 5 are terminated in spade lugs. Separate connector bodies are used and disposed at approximately 90 degrees on the injector housing 180. Thus, the capillary heaters may be physically disconnected by disconnecting a plug without disabling the solenoid that operates the fuel injector ball valve.

In conclusion, capillary fuel injectors can be used in a number of ways by different engines to reduce fuelling lags due to transients. Since there is a wide variety of engine sizes and designs, each one will be optimized differently. However, it should be straightforward to provide some useful improvement in engine performance in almost all cases.

Having demonstrated the principal of capillary fuel injectors using a particular design, it should be understood that the use of a resistive tube to carry the fuel is not the only possibility. Equivalent results can be obtained with any method that rapidly heats a pressurized fuel supply such that flash vaporization occurs as the heated fuel leaves a port fuel injector nozzle.

What is claimed is:

1. An acceleration/deceleration transient controller for a spark-ignited internal combustion engine having at least one fuel injector, each fuel injector having an inlet end and an outlet end, the inlet end in fluid communication with a fuel source, comprising:
    a) at least one fuel conditioner having a fuel heater in fluid communication with said fuel source and said outlet end of said at least one fuel injector; and
    b) an electronic control unit controlling said fuel heater to reduce transients.

2. The transient controller of claim 1, wherein said at least one fuel conditioner having a fuel heater is comprised of one or more capillaries.

3. The transient controller of claim 2, wherein said capillaries are made from stainless steel or Inconel™ tubing.

4. The transient controller of claim 3, wherein said tubing is made from a stainless steel composition that includes about 18% chromium and 8% nickel.

5. The transient controller of claim 4, wherein said capillaries have a length in the range of about 1 to 7 inches and an outer diameter of less than about 0.050 inches.

6. The transient controller of claim 5, wherein said capillaries have a wall thickness of less than about 0.005 inches.

7. The transient controller of claim 3, wherein said capillaries have a length of about 2 inches, an outer diameter of about 0.030 inches and an inner diameter of about 0.029 inches.

8. The transient controller of claim 2, wherein said at least one fuel conditioner having a fuel heater is comprised of four capillaries.

9. The transient controller of claim 8, wherein said capillaries are made from stainless steel or Inconel™ tubing.

10. The transient controller of claim 9, wherein said tubing is made from a stainless steel composition that includes about 18% chromium and 8% nickel.

11. The transient controller of claim 10, wherein said capillaries have a length in the range of about 1 to 7 inches, and an outer diameter of less than about 0.050 inches.

12. The transient controller of claim 11, wherein said capillaries have a wall thickness of less than about 0.005 inches.

13. The transient controller of claim 8, wherein said capillaries have a length of about 2 inches, an outer diameter of about 0.030 inches, and an inner diameter of about 0.029 inches.

14. The transient controller of claim 1, wherein said fuel heater is electric.

15. The transient controller of claim 14, wherein said electric fuel heater produces heat by conducting electricity through thin-walled capillaries containing fuel.

16. The transient controller of claim 15, wherein said fuel heater heats the fuel sufficiently enough to produce flash vaporization.

17. The transient controller of claim 1, wherein said electronic control unit comprises a conventional fuel injector control section and a transient control section.

18. The transient controller of claim 17, wherein said transient control section further comprises:
    a) a fuel demand less than part load detector;
    b) a lean or rich exhaust gas deviation from stoichiometry greater than selected thresholds detector; and
    c) a logical AND of said detectors to turn on said fuel heater.

19. The transient controller of claim 18, wherein said lean or rich deviation from stoichiometry greater than selected thresholds detector uses different thresholds for lean and rich deviation.

20. The transient controller of claim 17, wherein said transient control section further comprises:
    a) an accelerator pedal velocity generator; and
    b) an accelerator pedal velocity greater than a threshold detector that turns on said heater.

21. A method of improving the transient response of an internal combustion engine having at least one fuel injector fed by a fuel source, the fuel injector having an inlet end and an outlet end, comprising the steps of:
    1) providing a fuel conditioner in fluid communication with the fuel source and the outlet end of the at least one fuel injector wherein said fuel conditioner has an electric heater;
    2) determining if the exhaust gas oxygen level deviates from a stoichiometric condition by more than a threshold value and, if so;
    3) turning on said electric heater.

22. The method of claim 21, wherein the fuel conditioner having a fuel heater is comprised of one or more capillaries.

23. The method of claim 22, wherein said capillaries are made from stainless steel or Inconel™ tubing.

24. The method of claim 23, wherein said tubing is made from a stainless steel composition that includes about 18% chromium and 8% nickel.

25. The method of claim 24, wherein said capillaries have a length in the range of about 1 to 7 inches, and an outer diameter of less than about 0.050 inches.

26. The method of claim 25, wherein said capillaries have a wall thickness of less than about 0.005 inches.

27. The method of claim 23, wherein said capillaries have a length of about 2 inches, an outer diameter of about 0.030 inches, and an inner diameter of about 0.029 inches.

28. The method of claim 22, wherein the fuel conditioner having a fuel heater is comprised of four capillaries.

29. The method of claim 28, wherein said capillaries are made from stainless steel or Inconel™ tubing.

30. The method of claim 29, wherein said tubing is made from a stainless steel composition that includes about 18% chromium and 8% nickel.

31. The method of claim 30, wherein said capillaries have a length in the range of about 1 to 7 inches and an outer diameter of less than about 0.050 inches.

32. The method of claim 31, wherein said capillaries have a wall thickness of less than about 0.005 inches.

33. The method of claim 28, wherein said capillaries have a length of about 2 inches, an outer diameter of about 0.030 inches, and an inner diameter of about 0.029 inches.

34. The method of claim 21, wherein said fuel heater is electric.

35. The method of claim 34, wherein said electric fuel heater produces heat by conducting electricity through thin-walled capillaries containing fuel.

36. The method of claim 35, wherein said fuel heater heats the fuel sufficiently enough to produce flash vaporization.

37. The method of claim 21, wherein in step 2, a different threshold is used for a lean condition and a rich condition.

38. The method of claim 37, wherein the fuel conditioner having a fuel heater is comprised of one or more capillaries.

39. The method of claim 38, wherein said fuel heater is electric and produces heat by conducting electricity through thin-walled capillaries containing fuel.

40. The method of claim 37, wherein said fuel heater heats the fuel sufficiently enough to produce flash vaporization.

41. A method of improving the transient response of an internal combustion engine having at least one fuel injector fed by a fuel source, the fuel injector having an inlet end and an outlet end, comprising the steps of:
  1) providing a fuel conditioner in fluid communication with the fuel source and the outlet end of the at least one fuel injector, wherein said fuel conditioner has an electric heater;
  2) determining if the exhaust gas oxygen level deviates from a stoichiometric condition by more than a threshold value and, if so;
  3) determining if the load on the engine is less than a part load and, if so;
  4) turning on said electric heater.

42. The method of claim 41, wherein the fuel conditioner having a fuel heater is comprised of one or more capillaries.

43. The method of claim 42, wherein said fuel heater is electric and produces heat by conducting electricity through thin-walled capillaries containing fuel.

44. The method of claim 41, wherein said fuel heater heats the fuel sufficiently enough to produce flash vaporization.

45. The method of claim 41, wherein in step 2, a different threshold is used for a lean condition and a rich condition.

46. The method of claim 45, wherein the fuel conditioner having a fuel heater is comprised of one or more capillaries.

47. The method of claim 46, wherein said fuel heater is electric and produces heat by conducting electricity through thin-walled capillaries containing fuel.

48. The method of claim 45, wherein said fuel heater heats the fuel sufficiently enough to produce flash vaporization.

49. A method of improving the transient response of an internal combustion engine having at least one fuel injector fed by a fuel source, the fuel injector having an inlet end and an outlet end, and an accelerator pedal, comprising the steps of:
  1) providing a fuel conditioner in fluid communication with the fuel source and the outlet end of the at least one fuel injector wherein said fuel conditioner has an electric heater;
  2) determining if the rate of change of the accelerator pedal position in a direction that increases air into the engine is greater than a threshold and, if so;
  3) turning on said electric heaters.

50. The method of claim 49, wherein the fuel conditioner having a fuel heater is comprised of one or more capillaries.

51. The method of claim 50, wherein said fuel heater is electric and produces heat by conducting electricity through thin-walled capillaries containing fuel.

52. The method of claim 49, wherein said fuel heater heats the fuel sufficiently enough to produce flash vaporization.

* * * * *